United States Patent
Kiendl et al.

(10) Patent No.: US 6,654,681 B1
(45) Date of Patent: Nov. 25, 2003

(54) METHOD AND DEVICE FOR OBTAINING RELEVANT TRAFFIC INFORMATION AND DYNAMIC ROUTE OPTIMIZING

(75) Inventors: Robert Kiendl, München (DE); Günter Schmidt, Unterhaching (DE)

(73) Assignee: Definiens AG, Munich (DE)

( * ) Notice: Subject to any disclaimer, the term of this patent is extended or adjusted under 35 U.S.C. 154(b) by 0 days.

(21) Appl. No.: 09/890,644

(22) PCT Filed: Feb. 1, 2000

(86) PCT No.: PCT/EP00/00813

§ 371 (c)(1),
(2), (4) Date: Jan. 15, 2002

(87) PCT Pub. No.: WO00/46777

PCT Pub. Date: Aug. 10, 2000

(30) Foreign Application Priority Data

Feb. 1, 1999 (DE) .......................................... 199 03 909

(51) Int. Cl.⁷ ................................................. G06G 7/70
(52) U.S. Cl. ...................... 701/117; 701/118; 701/119; 701/201; 701/208; 340/905
(58) Field of Search .......................... 701/117–119, 200, 701/201, 208–210; 340/904, 905

(56) References Cited

U.S. PATENT DOCUMENTS 4,706,086 A * 11/1987 Panizza ....................... 340/905
5,371,678 A * 12/1994 Nomura ....................... 701/210
5,406,490 A * 4/1995 Braegas ....................... 701/210

FOREIGN PATENT DOCUMENTS

DE  40 34 681    * 5/1992
DE  196 04 084   * 5/1996

* cited by examiner

*Primary Examiner*—Richard M. Camby
(74) *Attorney, Agent, or Firm*—Blakely, Sokoloff, Taylor & Zafman

(57) ABSTRACT

The invention relates to a method for dynamically obtaining relevant traffic information and/or for dynamically optimizing a route followed by a first vehicle which belongs to a self-organizing traffic information and/or traffic guidance system to which other vehicles belong as well. Said method consists of the following steps: generating own data by means of vehicle-mounted sensors and/or other information sources in the first vehicle; transmitting data relevant to the first vehicle or other vehicles; receiving data transmitted by other vehicles; storing data obtained from received and/or own data; generating and transmitting requests regarding data which can possibly be provided by other vehicles; and potential relaying received data by retransmitting said data in processed or unprocessed form.

55 Claims, 1 Drawing Sheet

Figure 1:
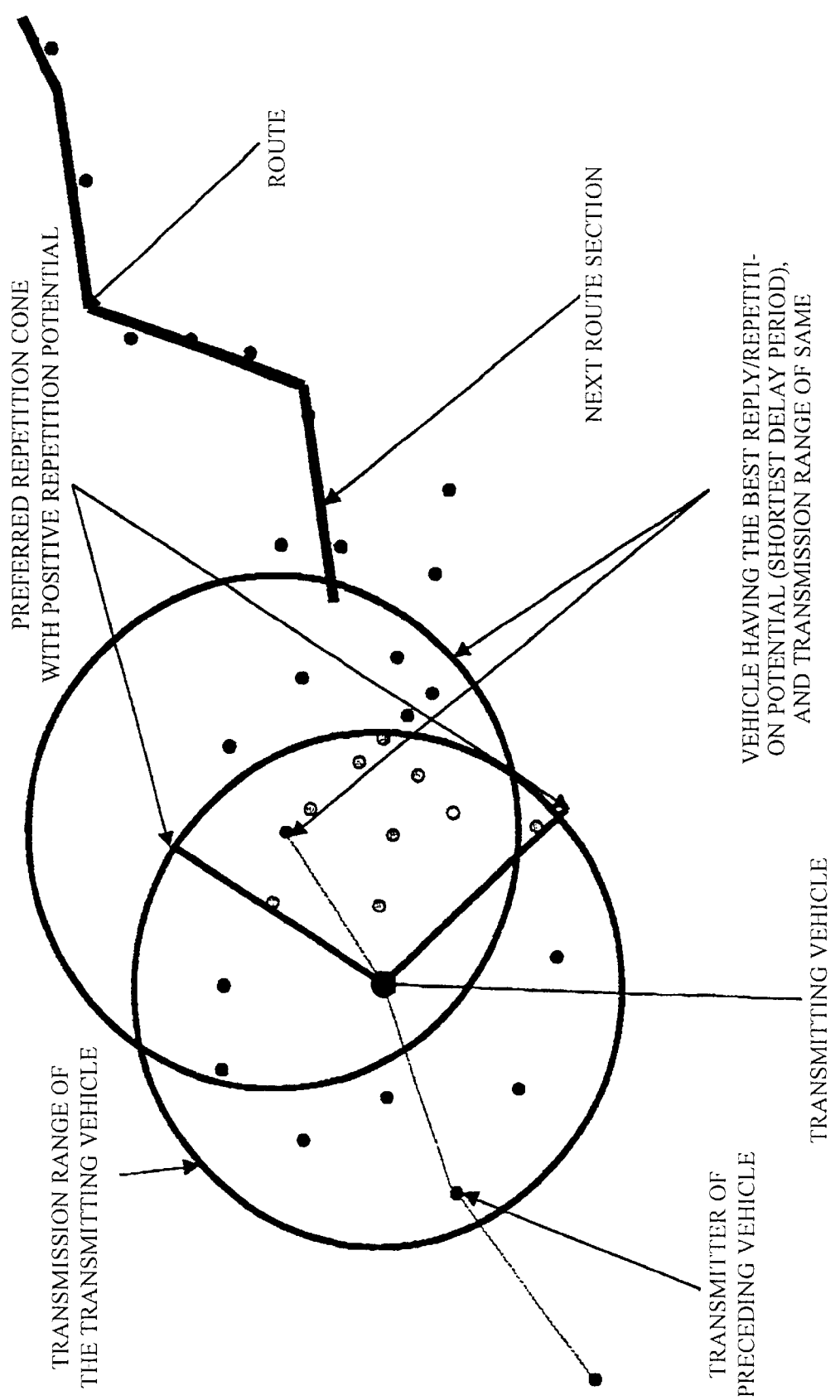

METHOD AND DEVICE FOR OBTAINING RELEVANT TRAFFIC INFORMATION AND DYNAMIC ROUTE OPTIMIZING

DESCRIPTION

The invention relates to a method and apparatus for obtaining relevant traffic information and for dynamic optimization of a route of vehicles pertaining to a self-organizing traffic guidance system in accordance with the preambles of claims 1 and respectively, and in particular to a method for a self-organizing system for traffic guidance, signaling traffic disturbances and extraction of statistical data, as well as to a method for efficient, purposeful dissemination of third data in an information network under formation.

Previous methods or devices for traffic guidance to a large extent rely on an external, fixedly installed traffic detection or on central information processing, respectively.

In order to increase the rate of vehicles passing through a particular traffic section and thus to increase the mean velocity of the vehicles in particular in the event of an elevated traffic volume, conventional traffic guidance systems have already been fixedly installed along traffic sections particularly that are subject to particularly intense utilization such as, for example, heavily frequented highways etc. The like conventional, fixedly installed traffic guidance systems possess a multiplicity of detection devices detecting, for example, traffic density, the velocity of the flow of vehicles, the environmental conditions such as, e.g., temperature or fog, etc., and by means of the respective detection signals control vehicle traffic along the predetermined amended documents section with the aid of indicator panels, such that a uniform traffic flow having a maximum possible velocity is created.

One drawback in such conventional traffic guidance systems is their fixed installation along a predetermined road section, resulting in extraordinarily high purchasing costs. In addition, such a fixedly installed traffic guidance system only has low flexibility as it exclusively controls or guides traffic in relatively short sections.

In order to enhance flexibility, U.S. Pat. No. 4,706,086 proposes a communication system between a multiplicity of vehicles, wherein signals and information are transmitted in accordance with the respective running conditions of the vehicle via a a transmitter/receiver unit with the aid of electromagnetic radio waves.

Moreover from U.S. Pat. No. 5,428,544 a device and a method for signalling local traffic disturbances are known, wherein the vehicle data or running conditions of the vehicle such as, e.g., the speed, the route and the direction are mutually transmitted via communication means. Transmission of the respective data to another vehicle is herein achieved in an indirect manner by way of an oncoming automobile.

A method and apparatus in accordance with the preambles of claims 1 and 58, respectively, is known from DE-A-40 34 681.

In the former traffic guidance systems, the vehicle data are either detected in a locally limited area by fixedly installed equipment and are only available locally, or they are detected in a large area by a plurality of mobile means, but are relayed with such a low degree of efficiency as to also be only available locally, wherein the planning or optimization of a route of vehicles beyond a local area with consideration of traffic-relevant quantities of the entire travelling distance is not supported. It is, however, not known to dynamically obtain relevant traffic information.

The invention is therefore based on the object of furnishing a method and apparatus for dynamically obtaining relevant traffic information, wherein relevant traffic information is created in a second location which may be at any distance whatsoever from a first location, and is efficiently relayed to the first location.

In accordance with the invention, this object is attained through the measures and features of claims 1 and 58.

Further advantageous developments are the subject matters of the dependent claims.

The method of the invention for dynamically obtaining relevant traffic information and for dynamic optimization of a route of a first vehicle pertaining to at least one self-organizing traffic information system and traffic guidance system to which further vehicles pertain, includes the following steps performed by the first vehicle: creating own data on the basis of at least one of on-board sensors and other information sources in the first vehicle; emitting data that are relevant for the first vehicle or for other, corresponding to a broadcast; receiving data transmitted by other vehicles; storing data obtained from at least one of received and own data; creating and transmitting inquires concerning data which may be furnished by other vehicles, corresponding to a request; and relaying of received data by re-transmission of these data in a processed or unprocessed form, corresponding to a replication.

Thus the method according to the invention in principle allows for an autonomous, self-organizing traffic information network in which the participating vehicles at the same time generate, distribute, bundle and utilize the required information.

The method operates in a particular scale-invariant manner, i.e. fractal-hierarchical manner, so that with respect to the type of processing and with respect to the communication volume—at least with regard to dynamic route optimization and signalling of traffic disturbances which constitutes a safety aspect—it is not of importance what order of distances is aimed at.

The method is operable on highway networks just like in a street network of a large city.

In particular the communication volume scales well, i.e. "<n*log n", with the overall number of participating vehicles and the surface of the area.

Despite the fundamental autonomy of the system, however, centrally generated information may also smoothly be routed into the system, and information may also be extracted from the system, e.g. for statistics purposes, and compiled centrally.

An enormous advantage in terms of costs, optimum efficiency, a high degree of failure safety and at the same time a bundled increased value as well as a unified user interface are thus achieved in comparison with existing methods. At a high degree of implementation, this system may in addition be used as a safety system.

Besides, the network formed through the instant method also offers an extremely efficient platform for the transmission of third data up to mobile telephony. It is even readily possible to enhance effectivity of the resulting communication network through utilization or smooth integration of a backbone line network.

In particular the method and apparatus of the instant invention might have the following further features.

Inquiries might be answered, partly answered, relayed and/or partly relayed, corresponding to a response and a replication.

Answering inquiries and/or handing on inquiries and other data are performed by vehicles having a suitable/optimum information status or having a favorable/optimum current position for relaying, whereby an optimization of answering and relaying is achieved.

In steps [a] and [d] of the method, travel history data are additionally created by the vehicles, whereby the significance of the data is increased.

In steps [b] and [c] of the method, a source group of vehicles associated with the first vehicle are designated for receiving data from respective vehicles; herein the data may be stored, accumulated and preprocessed in the receiving vehicles for the purpose of generating source data for the subsequent steps, corresponding to a first source formation.

In preprocessing the source data, mean velocities, maximum velocities, traffic density measures, backup sensitivities, bundled up-to-dateness measures and/or bundled relevance measures may be calculated, corresponding to a second source formation.

Designation of the group of vehicles is performed by designating an adjustable transmitting field strength or transmitting range of the first vehicle, thereby defining a first transmitting range.

The adjustable transmitting field strength is controlled such that on the average a predetermined criterion with respect to a parametrizable number of vehicles within reach is satisfied, thereby defining a second transmitting range.

The transmitting field strength control may incorporate positions and employed transmitting field strengths of neighboring vehicles encoded into the received signals, thereby defining a third transmitting range.

The route of the first vehicle from its current position to a selected target is determined by means of stored way data, and the route is subdivided into way segments.

The first vehicle can transmit inquiries for information relating to a practicability and other traffic-relevant quantities on candidate way segments to be travelled later on.

Replies to inquiries by the first vehicle are returned to the first vehicle directly or via relaying, wherein the information in the replies may also be received, stored, accumulated and processed for suitable further use by transmitting vehicles and by vehicles which also receive the replies, corresponding to a caching and a utilization.

The travel history data, source data, buffer memory data which in particular contain the stored, accumulated and processed information, and reply data in the vehicles may each be stored in an individual map structure superseding a static global map structure or existing in parallel therewith.

From running condition data, travel history data and/or data obtained by combining running data of several vehicles, it is possible to also create, modify or delete new map structure elements in the individual map structure data, and also extract them from the traffic guidance system for external utilization.

For purposes of internal processing and referencing in transmission signals, a subdividing of the individual map structure into way segments satisfying a predetermined criterion with regard to a length is performed, corresponding to a first map representation.

Combining way segments of the individual map structure is carried out for purposes of internal processing and referencing in transmission signals into groups and superordinate groups each having their own identifications, corresponding to a second map representation, or a compression through hierarchy formation.

A first calculation of the route of the first vehicle from its current position to a selected target may be carried out with the aid of statically stored or already available dynamic distance data, corresponding to a static or dynamic routing.

A recalculation of the route may be carried out based on modified data in the individual map structure for the purpose of iterative optimization of the route.

In creating inquiries, a desired up-to-dateness may be encoded into die inquiry, corresponding to an update request.

Answering an inquiry may be carried out, depending on a desired up-to-dateness, from source data of vehicles in the vicinity of the target area of the inquiry, or from buffer memory data in particular containing the stored, accumulated and processed information, of vehicles far removed from the target area and closer to the inquiring vehicle, so that the number of instances of relaying inquiries may be kept low, corresponding to a cache utilization.

A favorable vehicle from among the group of vehicles which is capable of answering and/or relaying the inquiry, may be determined through an evaluation method wherein an evaluation measure is determined in dependence on the up-to-dateness or a relevance of data already available to the respective vehicle and concerning way segments in question, the number of inquiries which can be answered on the basis of already available data, and/or the distance of the respective vehicle whose inquiry cannot be answered from the next way segment, corresponding to a first delay routing.

In dependence on the evaluation measure, a delay period for emitting a reply and/or relaying may be set which becomes shorter with an increasing evaluation measure, so that vehicles are enabled to transmit earlier with a better evaluation measure, corresponding to a second delay routing.

A particular vehicle with an intention to transmit concerning a reply to an inquiry and/or relaying an inquiry with respect to a particular inquiry characterized by an action code may stop the intended emission if it receives a signal concerning the same inquiry and having the same action code from another particular vehicle which has preceded the particular vehicle due to a shorter delay period.

An assessment is carried out whether for a particular way segment an inquiry is to be created, corresponding to a calculation of a first necessity of inquiry. Hereby the communication volume is reduced.

The assessment whether an inquiry is to be created for a particular way segment is carried out in dependence on the distance of the way segment from a current location of said first vehicle, the estimated time until arrival at the way segment, a weighting factor of the way segment, a backup frequency known from the past and/or the up-to-dateness of already available data relating to the way segment, corresponding to an evaluation of a second necessity of inquiry.

Transmitted data may include information concerning a signal type, a vehicle identification, the utilized transmitting field strength, a location of the vehicle, an unambiguous action code, as well as a list of identifications of previously used transmitter vehicles in the form of a history list, whereby first information contents are defined.

Transmitted data may moreover include information concerning way segment identifications, a moving direction, a proportion of a covered way segment, a mean velocity, a maximum velocity, the vehicle density, and/or a up-to-dateness/time marking of the information, whereby second information contents are defined.

Handing back a reply to an inquiry may be carried out by using the history list, corresponding to a first handing back or utilization of the history list.

Handing back a reply to an inquiry by a relaying method may furthermore take place in analogy with forwarding the inquiry, corresponding to a second handing back or to a renewed routing, respectively.

The first vehicle creates and transmits a plurality of inquiries relating to single way segments, which are each individually answered and/or relayed as well as returned with a reply, or an inquiry relating to the entirety of way segments, wherein the inquiry relating to the entirety of way segments includes a plurality of partial inquiries relating to single way segments, which are successively answered or relayed by the vehicles of a chain of transmitter vehicles, corresponding to a combination of inquiries.

One or several groups of vehicles are formed which are each in possession of data of particular neighboring way segments, with group relevant data common to respective vehicles being available such that an inquiry concerning data of such groups may be answered by each vehicle of the group, or answering may be effected through few instances of relaying, corresponding to a first source hierarchy formation.

From the groups one or several superordinate groups are formed which are each in possession of data of particular neighboring way segments, wherein supergroup-relevant data common to the respective vehicles are available, such that an inquiry concerning data of such superordinate groups may be answered by each vehicle of the superordinate group, or answering may be effected through few instances of relaying, corresponding to a second source hierarchy formation.

Vehicles of the group create and transmit data containing information relating to a position, extension and minimum lifetime of the group, corresponding to a third source hierarchy formation by means of a group protocol.

Group data may contain mean velocities, maximum velocities, vehicle density measures, up-to-datenesses/time markings and/or information relevance measures with respect to the entirety of the vehicles of the group, corresponding to a fourth source hierarchy formation by means of group data.

Group formation may moreover take place in that group formation applications by one or several vehicles or subgroups are accumulated, and in that the actual group formation is only determined when a threshold is exceeded, corresponding to a fifth source hierarchy formation by means of a group formation.

To a vehicle or to a group of vehicles external data are supplied for directional or non-directional handing on, wherein a group formation may also be brought about through these external data, corresponding to supplying external data to vehicles and groups.

The external data may contain information relating to a backup prognosis, corresponding to an external prediction.

Information relating to a backup prognosis or other traffic-relevant quantities is extracted and stored externally, wherein it is also possible to cause a group formation from inside or from outside of the system in order to obtain the relevant quantities, corresponding to an extraction of traffic data.

The external data contain information relating to connectivity with other traffic systems, such as railway, subway, urban railway, air and/or boat traffic, whereby an intermodal traffic is defined.

Information relating to a backup prognosis due to events detected in the past and occurring cyclically is generated from vehicle data signals and transmitted, wherein group formation may also be initiated for the purpose of cyclic backup prognosis, corresponding to a periodical prediction.

Information relating to a backup prognosis due to events detected in the recent past is generated from vehicle data signals through extrapolation of the traffic flows or simulation and transmitted, wherein group formation may also be initiated for the purpose of simulative backup prognosis, corresponding to a simulative prediction.

Information relating to a backup prognosis and/or other traffic-relevant quantities is stored within a group of vehicles to be designated and continues to exist there.

Data relating to a dangerous approach of the first vehicle to another vehicle pertaining to the traffic guidance system or to a group pertaining to the traffic guidance system is generated and/or transmitted, whereby a safety system is defined.

Handing back of inquiries that have not been answered takes place in the form of specially marked pseudo-replies, whereby a first pseudo-reply is defined.

The fact that a relayed inquiry has not been answered may moreover be detected in that when an inquiry is relayed by a particular vehicle, emission of a pseudo-reply is concurrently determined with a high delay time, whereby a second pseudo-reply is defined.

Emission of the pseudo-reply from the particular vehicle may be stopped in that another particular vehicle located within reach of the particular vehicle in its turn answers or hands on the relayed inquiry, which fact may be recognized by the particular vehicle on account of an action code of the inquiry, whereby a third pseudo-reply is defined.

Information is combined upon return of replies to inquiries or upon intermediate storage in transmitter vehicles, so that data from a greater distance may be compressed more strongly/resolved more roughly by an inquiring party, corresponding to an integration.

Emitted data signals are relayed, in analogy with processing inquiries, both along a one-dimensional channel up to a target location and also two-dimensionally into a more extended target area encoded into the data signal, corresponding to a further integration.

Data signals contain information which, on account of a particular event, is created by a vehicle and transmitted directionally or non-directionally, corresponding to an event broadcast.

The vehicles are land vehicles for road or rail traffic, water vehicles, aircraft or other mobile, manned or unmanned units moving in a jointly utilized traffic space and capable of being equipped with limited-range communication means.

Vehicles may also be particular pseudo-vehicles having a special communicative purpose of sending data signals out of the traffic guidance system or into the traffic guidance system, feeding in third data, need not necessarily be mobile, but at least are equipped with compatible communication means.

Via a pseudo-vehicle or a station a connection with another telecommunications network is established.

Pseudo-vehicles or stations are created which are linked among each other by an external communication network and establish a more favorable mutual connection of said vehicles or between said vehicles and a transmitter/receiver located outside the traffic guidance system, whereby a backbone network is defined.

By the communication means of the vehicles and/or the pseudo-vehicles/stations a telecommunications network is formed.

In accordance with the invention, an apparatus for determining and optimizing a route of a first vehicle pertaining to a traffic guidance system to which further vehicles pertain is created, including: detection means for detecting local vehicle data to be transmitted; transmitter/receiver means for transmitting/receiving radio signals containing respective vehicle data to be transmitted/received; intensity adjusting means for freely adjusting a particular transmitting field strength up to a maximum transmitting field strength; intensity detection means for detecting the intensity of the respective received radio signals; storage means for storing data; group designating means for designating a group associated with the first vehicle following reception of the vehicle data of the respective vehicles; route determining and segmenting means for determining, with the aid of stored distance data, a route of the first vehicle from its current position up to a selected target and subdividing it into way segments; and route optimization means for making an inquiry concerning vehicle data containing information relating to practicability of the respective way segments to the group of vehicles and determining an optimized route by means of vehicle data received in response to the inquiry. By the above described features a structure of an intelligent communication device is created.

Moreover delay period signal generation means may be contained for emitting a data signal only after lapse of the determined delay period in dependence on a freely determinable time delay value, whereby a first delay generation takes place.

Moreover control means may be contained, whereby emission of the delayed data signal may subsequently be stopped prior to lapse of the delay period, whereby a second delay generation takes place.

The present invention shall be described in more detail hereinbelow by way of embodiments while referring to the drawing.

FIG. 1 shows a schematic representation of implementation of the communication between vehicles of a traffic guidance system in accordance with an embodiment of the present invention.

For implementing the method of the present invention, a vehicle is equipped with a:

Communication unit (transmitter/receiver means) for communication on a vehicle-vehicle level
  Preferably a digital, multiplexed transmission standard similar to digital mobile telephony networks is used. The standard should ideally employ an asynchronous protocol. At the lowermost level suitably a "collision detection" method with error correction should be employed, similar to Ethernet. In principle, however, an analog standard with a corresponding correction method might also be sufficient. The communication unit should ideally be operable with a transmit power demanded by a computer unit of 0 up to a maximum transmit power of 5 Watts, for example.

Computer unit
  Medium-level requirements of computing speed and memory capacity are made to the computer unit. The computer unit should include a map module, for example on CD-ROM.

Movement sensing equipment or a device for detecting vehicle data
  The movement sensing equipment includes a velocity and directional sensor, ideally a GPS module. Further sensors may be incorporated.

The method steps are in particular carried out or caused under control by the computer unit.

The basic unit of the computer unit's internal map or map module is a route section or a way segment. All stretches of road are represented as combinations of route sections in the internal map. The connecting points between route sections are termed nodes. Turning prescriptions, one-way streets etc. are defined as limitations on the route sections/nodes.

In the method of the present invention, various processes described in the following simultaneously co-operate. Herein a number of parameters must be sensibly selected which may, however, only be achieved with a concrete installation of the method or with the aid of a detailed simulation. Indicated parameters are preliminary estimates. The parameters represent traffic-relevant quantities which, besides practicability for example also may be data relating to weather detection, such as rain or temperatures, vehicle operation conditions, such as airbag activation, ABS activation, gradient measurements etc.

Non-directional Broadcast/Default Action:

All participating vehicles "without being prompted" carry out a default action. For example they transmit in a specific temporal distance of, e.g., 2 minutes their movement data as a non-directional broadcast or as a non-directional transmission of a "lowermost hierarchy level". The transmitted data include information about the recent travel history, such as, e.g., the mean running velocity on the route sections travelled in the last 5 min. All vehicles within the range of approximately the intended transmitting range receive the broadcast signal.

An open parameter herein furthermore is the transmitting field strength to be used which determines the transmitting range. It results from a closed-loop control. At the beginning, a suitable default transmit intensity is used. The transmit intensity used as a rule is always also jointly encoded into the broadcast. Each vehicle in the course of time learns about the data of the surrounding vehicles. It then approximately knows the vehicle density or density distribution in the surroundings. Thereupon it may tune its transmit intensity such that approximately a predetermined maximum number of vehicles, such as e.g. 100 vehicles, may be reached by one broadcast. As the used transmit intensity is always jointly encoded, the relationship between transmit intensity and transmitting range to be expected may also constantly be readjusted depending on environmental conditions, under circumstances even in dependence on direction. What lastly is to be achieved through transmitting field strength control is that, with respect to the channel occupancy and the specifically used "collision detection" method in accordance with the requirements of the communication layer, an optimum transmission bandwidth is available for the entirety of the vehicles. Furthermore under an aspect of good scaling behavior of the communication volume, with a system breakdown not occurring even in the event of an elevated number of participants, it is important that not too many vehicles will be reached by a single broadcast, for example in the center of a city.

The present method in accordance with the invention thus need not yet make any excessively specific demands to the lowermost transmission layer, but may in wide ranges be adapted to a specific communication setup by adjusting few parameters.

The non-directional broadcast results in the creation of groups "smeared" in terms of information as regards the route sections. For example approximately 30 vehicles "know" about the moving data on a particular highway section or on a heavily frequented inner city route section. All information units transmitted carry a time marking which characterizes the respective up-to-dateness, as well as a relevance measure which characterizes how reliable/complete the information is. For example a percentage of the route sections already travelled on may be used. From this evaluation and accumulation of the data of various vehicles there consequently results an "image" of the overall traffic, and this "image" is distributed and stored in the groups. Various movement variables/parameters may be accumulated, for example mean running velocity/travel time, maximum running velocity, traffic density, backup sensitivity, with the possibility of determining the latter from a long-period integration, etc.

Request:

The request closely co-operates with dynamic route planning proper: the starting point of dynamic route planning is static route planning. The computer unit of a vehicle initially calculates a preliminary optimum route in a conventional manner, as it were, in accordance with the built-in map which contains preliminary data concerning the maximum travel velocities on the route sections.

For this currently envisaged route it is now attempted to find out whether the underlying maximum travel velocities and optionally other derived basic parameters, such as fuel consumption, environmental burden etc., are correct.

To this end inquiries, i.e. requests relating to the moving data for the route sections are dispatched via the transmitter/receiver means of the vehicles. All route sections of the route are searched, wherein it is decided whether a request for the respective route section is even necessary at present, for a request is costly in the sense that it brings about a communication volume or a communication expenditure, respectively. In a sense, the importance for a request of the respective route section is estimated only when the evaluation exceeds a particular level, for example the value 1 in a normalized evaluation system, the route section is noted down for the request. The criteria for estimating the importance are, for example, distance of the route section in the planned route from the current location, estimated distance of the route section in terms of travel time, importance of the road on which the route section is situated ("road class"), and/or up-to-dateness of the already existing data concerning the route section. If data of an up-to-dateness of −3 min already exist, it is not necessary to dispatch a request relating to the route section in question.

Examination of the route sections in accordance with these criteria then results in a list of route sections for which a request is to be emitted. In the request a desired minimum up-to-dateness is furthermore entered. Interconnected route sections in this list may then be combined by means of a customary segmentation method, so that a bundled request may be formed. In principle it is also possible to form a single bundled request for all route sections in the list, which is then broken down or processed piecewise during the subsequent request repetition described further below. Moreover the request is then provided with an unambiguous action code which shall be described in more detail hereinbelow and which i.a. contains information on who has answered or relayed what inquiry, and with a repetition counter set to 0 and representing the number of instances of relaying.

Request Processing/Repetition:

The request is now emitted in accordance with FIG. 1. As the transmitting field strength, the one value is taken which results from the above described control mechanism in the broadcast. The request is "heard" by all vehicles within the transmission range. These vehicles then perform an evaluation. They estimate from the data available to them, i.e. from the broadcast or from the cache signal described hereinbelow, a reply potential or capacity and a repetition potential or capacity, (→handing on of the request). Herein criteria are taken into consideration such as, for example: how well can the requests be answered (up-to-dateness, relevance, in accordance with the above description); how many requests (number or percentage of the route sections) may be answered: if only a particular threshold value is reached, the overall reply potential is greater than 0 so that splitting the request into excessively small elements will not be brought about forcibly; and how well is the vehicle positioned in the direction towards the next route section the request of which cannot be answered.

From this evaluation there now results a ranking value, for example from 0 to 1, which corresponds to the reply or repetition potential. From the ranking value a delay period is calculated. A high ranking value will result in a short delay period, and evaluations having not only a repetition potential but also a reply potential greater than 0 fundamentally result in a shorter delay period than evaluations having only a repetition potential. The parameters are to be selected such that, where possible, only vehicles within a cone in a direction towards the next route segment receive a potential greater than 0 in accordance with the representation of FIG. 1. Subsequent repetitions may then be heard mutually.

Both the planned repetition with requests relating to the remaining route sections, and the planned reply are placed or stored in a transmission register together with the calculated delay period. This results in a stack of "intentions to transmit".

This stack is then processed in the course of time. When the respective delay period has lapsed, the corresponding packet is transmitted. If, however, in the meantime a reply or a repetition having the same action code and at least an equally large repetition counter has come in, then another vehicle has preceded the intended transmitting action. Apparently this vehicle had a higher or comparable reply/repetition potential. The corresponding entries from the stack are then deleted (selection of the max. fittest). If a packet having the same action code and a lower repetition counter arrives, this packet is ignored. This has the result that inefficient, runaway request cycles are deleted. Every vehicle may also establish a list of younger request-action codes, by means of which non-optimum, vagrant erratic request chains are prevented from repetition and answering, respectively, and thus deleted in good time.

There now successively takes place a relaying and partial answering of requests. In the least favorable case a request thus would have to pass through the entire route in leaps of approximately the mean radius of transmission.

Information Return, i.e. Answer:

A request is at some time followed by a reply or answer, mostly in the form of a partial answer. It is now attempted to route back the reply to the receiver along the same way on which the request had arrived. During the request phase a history stack of transmitting vehicles in the request protocol is expanded at each repetition. Herein the respective vehicle ID or vehicle identification is entered in the stack. As a result of this ID stack, during the answering cycle the vehicle positioned at the very end of this list may always unambiguously take over answer repetition and in the process take its own ID from the history stack. This is under the assumption that the vehicle movements are substantially slower than the overall propagation times of the communication, so that the pattern of the transmission ranges will hardly have changed during answering in comparison with the request. Thus the case of a vehicle not being available any more in the history stack while the reply is returning would only occur very rarely. In such a case, however, the reply may be lost without prejudice in the absence of particular countermeasures. Upon the following request generation cycle of the inquiring vehicle, this will be noticed due to the data for the route sections in question not being up-to-date, and preferably a new request will rapidly be initiated.

In principle, the reply might, however, also be routed in accordance with the same complex method as in the request, i.e. merely through repetition towards the source location of the request, implying a respective evaluation by a repetition potential, delay routing etc. in accordance with the above explanations.

During reply routing the same transmitting field strengths as already used for the broadcast and the request may again be used. If need be, the transmitting field strength may also be slightly increased for the purpose of enhanced safety regarding accessibility.

In principle the method would already take effect if only the described request/answer mechanism were used. However the communication volume would be unnecessarily high and above all would not scale well with the travelling distances, the size of the road net, and the number of the vehicles. For transmitting non-cohesive third data, for example telephony or car internet, the described routing would, however, already be the main base.

The method according to the invention moreover is in particular characterized by the mechanisms described in the following and having a hierarchy-forming effect.

Caching:

While the inquired information returns via the route sections, the information is also stored by the transmitting vehicles and all vehicles hearing about it, in a region of the individual map specially designated as a cache. If, now, further requests come in from other vehicles and the up-to-dateness of the data in the cache is sufficient for answering the request, the request need not be repeated any more but may be answered directly from the cache. This mechanism in turn has a self-stabilization effect, for precisely at a high backup potential, high traffic densities and thus high communication demand, a large number of similar requests turn up which will then only very rarely have to proceed as far as the target area.

In cases of insufficient memory capacity, although this nowadays hardly represents a problem in view of the comparatively small amounts of information and the large available memories, a vehicle may remove respective outdated data from the cache, and if it is known that neighboring vehicles also store the information, entering the data into the cache may be carried out with a probability of less than 100%.

Integration:

Excess calculating capacity of the computer unit may be used for combining the information in the cache into connotational units. For example information about cities or city parts, by-pass roads, long stretches of highway, accumulations of border crossings might be combined into bundled information. One example for this is: slowly moving traffic on the entire "Mittlere Ring" [ring street] in Munich. For one thing, an inefficient request iteration may be prevented through additionally replying to corresponding requests by such bundled information. On the other hand, such information units generated through integration may, however, not only enter into route planning, but for example also presented to the driver on a display or per voice output etc. as condensed, meaningful background information. The integration method may, for example, employ additional pre-defined range markings in the built-in map, such as delimitations of Dynamic Group Formation on Higher Hierarchy Levels:

The above described non-directional broadcast only reaches vehicles in the range of a mean transmitting range. If, however, an information concerning certain route sections or stretches of road or other integration units, as was described above, is frequently requested through requests, the transmitting vehicles may cause the vehicles located on these road sections to distribute data in a wider periphery on their own initiative, preferably in the direction from which the majority of requests arrive. Vehicles moving on such frequent-request integration units are thus combined into groups, which initially takes place on a first hierarchy level. Like any other information, such group configurations initially also are of a temporary nature. They disintegrate on their own with a particular time constant when the incentive for the group formation, such as, for example, a high request volume, disappears. The groups are bound to the location, i.e. to stretches of road, city parts, highway segments, etc., and not to particular vehicles. In other words, when vehicles newly enter a route section agglomeration via which a group formation has taken place, they become part of the group. Through previous group broadcasts which may also be received beyond the group boundaries, such vehicles as a rule already learn about the existence of the group prior to entering such a route section. When leaving the group area, the vehicles also abandon their group membership and cease to transmit/replicate group broadcasts.

Initialization of a group is performed by vehicles which split up requests or in which requests come together, respectively. Such vehicles as a rule are not part of the group, for they mostly see the groups "from outside" (→a kind of group speaker). For generation of a group a generation request is sent to the route sections in question (routing in accordance with the above description). Generation of a group for reasons of stability does not take place upon the first initiation attempt by a group speaker vehicle. Rather, in the vehicle in question a "counter" for a particular group application is counted up. This counter would, in the absence of further actions, again become invalid with a particular time constant. Only when several requests (threshold value) for group formation come in, moreover from different vehicles and from various directions, and the "group applications" sufficiently overlap each other, a group is established for the first time. Such initialization of a group may take place starting out from a later group member in which the counter exceeds the threshold value for the first time. A first group broadcast may be used for this purpose on a protocol plane.

Group data are the area of the group source vehicles, as well as the target area for dissemination of the group information, for example a club shape in a direction from which many requests come in.

Technique of the Group Broadcast/Area Broadcast:

Each vehicle in the group emits a broadcast signal statistically with a particular temporal probability. Each broadcast carries a particular action code by means of which the broadcast replication is coordinated. Vehicles located in the marginal area of the reception range carry out a replication of the protocol in accordance with the same method as described above for the request repetition, with the only difference that the area broadcast does not have a local point-shaped target area but spreads two-dimensionally as far as the borders of the group target area.

In continuation of the method, hierarchies of groups may form. This may on the one hand take place in such a way that vehicles supplying source data simultaneously participate in several increasingly large-area groups, with groups of an identical hierarchy level possibly also overlapping (→"induced mixed hierarchies"). This process may on the other hand take place in the form of bundled group data in turn serving as information components for superordinate groups (→"true hierarchies"). The combination of groups into superordinate groups in turn takes place in accordance with the above description through information transmitter vehicles, as a rule external, who mostly from the outside "recognize" usefulness of a combination of the groups due to the routing activity. It is important that the groups are always generated dynamically and optionally again disintegrate over time when the incentive for the group formation disappears.

Wide-area Broadcast:

In accordance with the above described group broadcast method, any other information may furthermore be diffused two-dimensionally in any target area whatsoever. Such event-type information may be: particular events such as, e.g., accidents (activation of an airbag, etc.) and distress calls; search protocols whereby the location of a communication participant may be determined for subsequently establishing a communication channel; third data imported into the network, such as more or less local traffic news and backup predictions; and many more.

External Prediction/Intrinsic Prediction:

The hitherto described method very efficiently furnishes up-to-date traffic data. In planning longer travel routes it is, however, often of interest whether, for example, the traffic in a distance of 200 km will 2 hours later still be the same as represented at the current point of time. Such traffic predictions are particularly of interest for backup-prone highway sections. As was already indicated above, it may be a solution to the problem if traffic news services import third data into the network from the outside, such as, for example, backup prognoses, per wide-area broadcast. Another solution is for prognosis generation to take place partly automatically inside the network.

The starting point in both cases is that for such endangered, "prognostication-worthy" traffic areas, groups are instituted in accordance with the above described pattern. Namely, only groups may lastingly maintain location-bound data, for example by iterative hand-over between vehicles.

In the case of an external prediction, formation of a group may be caused by the prediction dispatch station in the area for which a backup or other prediction is to be made, and subsequently the prediction is handed over to the group. The local propagation pattern of such a group formation or prediction telegram or data packet then resembles a mushroom cloud. At first it propagates, like in a request, along a corridor to the target area and then spreads out two-dimensionally there. The group will then continue to exist for at least as long as required by the propagation time of the prediction. The prediction dispatch station then, in a manner of speaking, is the main group speaker. In the case of a request into the group area it is then also possible to jointly transmit the prediction in the reply or answer in accordance with the above description.

Automatic Prognosis:

When backups form, initially the formation of suitable groups takes place, for in the case of backups the criteria specified above for generation of groups are fulfilled automatically. If backups repeatedly occur within an area, such as in a daily rhythm, and this becomes conspicuous during the group lifetime, then initially the further minimum lifetime of the group may be raised so as to follow up this matter, in a manner of speaking. If the assumption of a periodical disturbance is corroborated (the required simple pattern recognition for the detection of periodical disturbances may unfold in all vehicles; fundamentally, the above mentioned "accumulation of applications" pattern applies: only when the application for "designation" of a periodical disturbance arrives, this knowledge gains factual validity in the group), the knowledge about this is taken up into the group memory as a "periodical prediction", and at the same time the group's minimum lifetime/expiry time constant is raised (for example five times the duration of the disturbance). There may, however, be a case where a normal group lifetime is not sufficient for corroborating the assumption of a periodical disturbance at a first time, for example because the groups would not outlive the following low-traffic night. Apart from the fact that this might then be initialized by an external provider station and in contrast with the above explanations would not have to be followed up any further, there also are automatic options:

1. Simple possibility: group minimum lifetimes are sometimes set higher than normal in group formation with a particular probability, thus for example longer than one day. At some point of time, this would then be sufficient for setting off the periodical prediction.

2. Effective and probably better option: each vehicle retains knowledge about past group memberships in a long-term memory which is not actively in effect. Some such vehicles, such as commuters etc., will then surely meet up again with a periodical backup in the next or following etc. period Such vehicles will then recognize the temporal coincidence of traffic disturbances and may initiate a prolongation of the group lifetime if only on assumption. Or, however, they may possibly, in the event of a corresponding "accumulation of applications", rather directly carry out instituting a periodical prediction. This long-term memory method also solves the problem of already existing periodical predictions or other location-bound group having to outlive, for example, a night with such low traffic volume that the iterative handover of the group data would consequently be discontinued. In a wider sense, it is thus possible by way of the long-term memory to ensure survival of a group which fails to have any members for a short period.

3. Utilization of an accessible, continuously active line network backbone station as described in the following, where available.

Interaction of Communication With Route Planning:

If it results from a request cycle that the movement parameters of the route sections underlying the route planning differ from the previous map data, such as a lower mean/maximum running velocity, then these movement parameters obtained as a result of the request or broadcast are entered into the individual map which, in a sense, supersedes the built-in map, for example on CD-ROM, or co-exists with it. Thereupon a "fastest-way algorithm" recalculates a route. This route may differ from the old route. If the route differs from the old route, the request cycle will be repeated for the new route sections which are still unknown/not sufficiently up-to-date any more. For the rest, the currently planned route is in order for the time being.

An improvement of the method is obtained in that the request cycle for a set of alternative routes is started from the very beginning.

Strictly mathematically speaking, this manner of proceeding is only correct if the request/broadcast data results in lower velocities than those of the built-in map. This is, however, the normal case. Cases having a reverse configuration, for example when a speed limit is cancelled, may, however, also be processed in the course of time by the following method: When such a case takes place repeatedly, it is diffused in the network by a wide-area broadcast as described hereinafter, and stored in a map update storage sector which supersedes the CD-ROM map. In the broadest meaning, such a process may be used for "map learning", i.e., for incorporating relevant data into the map.

The process of map learning shall be described in more detail hereinbelow. When vehicles are moving on stretches of road that are not registered in the existing map, or the assumption arises that parameters of the stretches of road have changed, with these parameters being, e.g., a one-way status, speed limits, a disappearance of stretches of road etc., then new map structure elements or parameters or preliminary stages thereof may be registered by the vehicles in the individual map or in a preliminary individual map based on related running condition data, to thereby obtain an automatic map generation or map updates. As the generation of such data by single vehicles and single events is, however, as a rule unstable, it is, for instance, possible to initiate the formation of above described, persistent source groups for the purpose of the data of several vehicles and data covering extended periods of time being pooled. Based on this aggregated data a more reliable data structure or a map update may take place. Preliminary and matured learned map structure data may, just like ordinary dynamic running condition data, be made available by the vehicles or source groups, e.g. by request, or also be actively disseminated via the utilized communication network. An external utilization, such as for example obtaining map raw data or map data, for the creation of maps externally of the system is possible in analogy with an above described extraction of statistical data. Thanks to the uninterrupted observation of the traffic condition, which is possible by pooling nearly any single contributions by the vehicles, particular data having a very high significance and up-to-dateness may be furnished which by far exceeds what is possible with customary forms of map creation, for example as a result of surveying, aerial photographs, etc.

The entire route planning and request cycle unfolds constantly during the entire journey. This results in additional dynamics. At any point of time the driver may thus be supplied with optimum route planning due to currently best possible knowledge.

If no data concerning route sections are obtained, it must be assumed that so few vehicles are travelling in the area in question that apparently the stretches of road are free. Thus the following assumption is a basic rule of the method: where data concerning a route section are not available, it has to be assumed that the route section is free. Or, when expressed from the opposite a viewpoint, the following self-stabilizing effect is achieved: the communication situation improves automatically wherever slow-moving traffic must be expected on account of increased traffic density.

Third Data:

Transmitting and receiving means through which third data are fed into the system or extracted from it, respectively, are considered pseudo-vehicles and as a rule have the inherent velocity 0. The manner in which such pseudo-vehicles are incorporated into the communication procedure does not fundamentally differ from ordinary vehicles. One example for a transmission of third data would, e.g., be an inquiry by a driver on his way from Nuremberg to Munich on the A9 highway, relating to a suitable urban railway connection in Munich from a Park+Ride station to the city center. The data transmission would in analogy with a request from the inquiring vehicle run to a known location in which a corresponding information provider has a network station.

Such pseudo-vehicles may furthermore, e.g., be traffic light installations comprising compatible communication means, so that due to the possible information access it is also possible to influence switching timing in dependence on traffic, or that in turn traffic control information is passed on to the vehicles and thus enables better route optimization. In addition, such pseudo-vehicles acting as active stations may become effective as supporting communicators in forwarding information, information processing and/or network coverage, for example if the degree of implementation is still low.

Backbone Line Network:

As special "pseudo-vehicles", backbone stations having a fast line network connection are conceivable. This results in a backbone line network which is capable of shortening a long-range communication in particular when the information is of a rather non-cohesive type (information rather not worth the effort of storing it on an anyway large number of intermediate stations (caching) in accordance with the above outlined philosophy, for example telephony as mentioned later. It should once again be noted that such a backbone network does not constitute an essential component of the method. The backbone stations for example do not have the task, as in the case of a mobile telephony network, to provide for a highest possible degree of coverage, but indeed only are an option for communication acceleration capacity. A backbone network will be useful particular when a large volume of third data transmissions occurs. Backbone stations may then be inserted quite purposefully and economically where the communication volume would meet a limit.

As regards the technique of backbone routings: The positions of backbone stations are made known regularly yet comparatively rarely by wide-area broadcast. Vehicles newly entering traffic may procure the information via such backbone positions at any time by request from neighboring vehicles and over a relatively short distance when information passes by a backbone station and this station recognizes that further routing of this information via the backbone network is more favorable, it will initially emit with a minimum possible delay period, in accordance with the above description, a special annihilation telegram as a substitute for the above described repetition telegram, with telegram in this instance having to be understood as a packet of forwarded data. This annihilation telegram in the same way as a repetition telegram has the effect that other vehicles will stop their possibly existing intention of routing on the information packet in the ordinary vehicle-vehicle network. In a given case the annihilation telegram may also have the form of an area broadcast over a range somewhat larger than the transmitting radius in order to achieve reliable elimination of the routing process in the ordinary network. The information packet will then be transmitted to the most suitable terminal node in the backbone network and from there again imported into the vehicle-vehicle network in accordance with the ordinary method.

1-to-1 Data Connection/Telephony:

A particular kind of third-data transmission takes place via a permanent directional connection between two participants designated by an ID, a telephone number etc.. Herein it is at first necessary for the participant desiring to initiate the connection to locate the communication partner in the network. In this respect there exist a number of possibilities which may also be combined:

1. In the presence of a backbone network: A central computer or several distributed computers in the backbone network may extract from the entirety of broadcasts, requests, answers and other telegrams passing over backbone stations the transmitter and receiver IDs and their positions and entertain a "fuzzy phone book", i.e. a telephone registry having fuzzy or not-secured entries in which the approximate locations of the vehicles/participants are registered. These registries need not be 100% correct. Inquiring communication partners may then extract an estimate for the position of the other partner.

2. It is being assumed here that an approximate location of the partner exists, either by looking up in a fuzzy phone book, by estimates based on the region in which the target vehicle customarily is, i.e. a home region, or through manual input. Then a search broadcast is sent to a target area in the range of this location, which corresponds to the above described "mushroom cloud" broadcast. When the sought party replies, the connection is established. If the sought party does not respond, initially other small possible searching areas may be inquired, or the search regions may be expanded increasingly. In the least favorable case, the entire network area would have to be searched by a wide-area broadcast.

3. All vehicles maintain in a not-required storage sector another long-term memory for vehicle IDs of telegrams passing by. Search broadcasts may then often provide a hint to the right direction much earlier.

4. All vehicles pertain to a particular home group in the sense of the vehicles communicating major changes of location to this home group by a directional spot. The home groups may either be actually established in a customary group in the vicinity of the vehicles' home base, or in turn be administrated by a backbone station or otherwise. Home groups, in a manner of speaking, are reliable locations in which the approximate current location of a vehicle may be inquired.

If the locations of the connection partners are known among each other, a durable connection channel must be established. Similar to the above described answering method, the history list which was formed upon first initiation of contact is now extracted from transmitter vehicles. This history list is used as the first connection list. By targeted, direct leaping along the vehicles contained in the connection list in both directions, efficient transmission of large data quantities may take place without the intense, above described delay mechanism used in request or area broadcast. Problems exist in the event of threatening interruption of connection as a result of the movements of the transmitting vehicles and of the communicating vehicles. This problem is resolved by the following technique:

1. When leaping the data from vehicle to vehicle, the positions of the transmitting vehicles are jointly transmitted as a rule. Thus the transmitting vehicles recognize, while the connection channel is established and constantly used, when the distance between two connection vehicles threatens to become so large that the connection is interrupted. When this danger is imminent, the two connection vehicles in question initiate a local relinking process in due time. They search among each other for a secure connection via an intermediate vehicle. This may take place with the aid of an ordinary request method as described above, possibly by indicating an artificially reduced transmitting field strength of, e.g., −20% so as to find a particularly secure channel. This intermediate vehicle will then be inserted into the connection list during the following routing on the connection roads.

2. It is furthermore permanently examined during connection routing by means of the positions of the connection positions whether the distance of vehicle hopping has reduced to such an extent that a connection vehicle may be removed from the connection list. This serves to prevent excessively inefficient from being created during connections existing over longer periods of time.

3. In larger time intervals a new, optimum connection channel is searched for by the two communication partners by way of a request independently of the existing connection channel/corridor. The new connection list thus obtained may then be used as of immediately.

What is claimed is:

1. A method for at least one of dynamically obtaining relevant traffic information and for dynamic optimization of a route of a first vehicle pertaining to at least one of a self organizing traffic information system and traffic guidance system to which further vehicles pertain, comprising the steps performed by the first vehicle;

[a] creating own data on the basis of at least one of on-board sensors and other information sources in said first vehicle;

[b] emitting data that are relevant for said first vehicle or for other vehicles;

[c] receiving data transmitted by other vehicles;

[d] storing data obtained from at least one of received and own data;

[e] relaying of received data by re-transmission of these data in a processed or unprocessed form, and

[f] creating and transmitting inquiries concerning data which may possibly be furnished by other vehicles.

2. The method according to claim 1, wherein inquiries are at least one of answered, partly answered, relayed and partly relayed by receiving vehicles.

3. The method according to claim 2, wherein at least one of answering inquiries and relaying inquiries and other data are performed by vehicles having a suitable/optimum information status or having a favorable/optimum current position for relaying.

4. The method according to claim 2, wherein in steps [a] and [d] travel history data are additionally created by said vehicles.

5. The method according to claim 4, wherein in steps [b] and [c] a source group of vehicles associated with said first vehicle is designated for receiving data from respective vehicles, wherein said data is stored, accumulated and pre-processed in said receiving vehicles for the purpose of generating source data for the subsequent steps.

6. The method according to claim 5, wherein in pre-processing said source data, at least one of mean velocities, maximum velocities, traffic density measures, backup sensitivities, bundled up-to-dateness measures and bundled relevance measures may be calculated.

7. The method according to claim 5, wherein designation of said group of vehicles is performed by designating an adjustable transmitting field strength or transmitting range of said first vehicle.

8. The method according to claim 7, wherein said adjustable transmitting field strength is controlled suds that on the average a predetermined criterion with respect to a parametrizable number of vehicles within reach is satisfied.

9. The method according to claim 8, wherein the transmitting field strength control may incorporate positions and employed transmitting field strengths of neighboring vehicles encoded into the received signals.

10. The method according to claim 5, wherein the route of said first vehicle from its current position to a selected target is determined with the aid of stored way data, and said route is subdivided into way segments.

11. The method according to claim 10, wherein said first vehicle transmits inquiries for information relating to a practicability and other traffic-relevant quantities on candidate way segments to be travelled later on.

12. The method according to claim 10, wherein replies to inquiries by said first vehicle are return ad to said first vehicle directly or via relaying, wherein said information in said replies is also stored, accumulated and processed for suitable further use by transmitting vehicles and by vehicles which also receive said replies.

13. The method according to claim 12, wherein the travel history data, source data, buffer memory data which in particular contain the stored, accumulated and processed information, and reply data are each stored in said vehicles in an individual map structure which supersedes a static global map structure or exists in parallel therewith.

14. The method according to claim 13, wherein from running condition data, travel history data and data obtained by pooling running data of several vehicles, it is possible to also a create, modify or delete new map structure elements in said individual map structure data, and also extract them from said traffic guidance system for external utilization.

15. The method according to claim 13, wherein for purposes of internal processing and referencing in transmission signals, a subdividing of said individual map structure into way segments satisfying a predetermined criterion with regard to a length is performed.

16. The method according to claim 15, wherein combining way segments of said individual map structure is carried out for purposes of internal processing and referencing in transmission signals into groups and superordinate groups each having their own identifications.

17. The method according to claim 13, wherein a first calculation of the route of said first vehicle from its current position to a selected target is carried out with the aid of statically stored or already available dynamic distance data.

18. The method according to claim 17, wherein a recalculation of the route is carried out based on modified data in said individual map structure for the purpose of iterative optimization of the route.

19. The method according to claim to 12, wherein in creating inquiries, a desired up-to-dateness is encoded into the inquiry.

20. The method according to claim 19, wherein answering an inquiry is carried out, depending on a desired up-to-dateness, from source data of vehicles in the vicinity of the target area of the inquiry, or from buffer memory data in particular containing the stored, accumulated and processed information, of vehicles far removed from the target area and closer to the inquiring vehicle.

21. The method according to claim 19, wherein a favorable vehicle from among said group of vehicles which is capable of at least one of answering and relaying said inquiry, is determined through an evaluation method, wherein an evaluation measure is determined in dependence on at least one of the up-to-dateness or a relevance of data already available to the respective vehicle and concerning way segments in question, the number of inquiries which can be answered on the basis of already available data, and the distance of the respective vehicle whose inquiry cannot be answered from the next way segment.

22. The method according to claim 21, wherein in dependence on said evaluation measure, a delay period for emitting at least one of a reply and relaying is set which becomes shorter with an increasing evaluation measure, so that vehicles are enabled to transmit earlier with a better evaluation measure.

23. The method according to claim 22, wherein a particular vehicle with an intention to transmit concerning at least one of a reply to an inquiry and relaying an inquiry with respect to a particular inquiry characterized by an action code stops the intended emission if i receives a signal concerning said same inquiry and having the same action code from another particular vehicle which has preceded said particular vehicle due to a shorter delay period.

24. The method according to claim 18, wherein an assessment is carried out whether an inquiry is to be created for a particular way segment.

25. The method according to claim 24, wherein said assessment whether an inquiry is to be created for a particular way segment is carried out in dependence on at least one of the distance of the way segment from a current location of said first vehicle, the estimated time until arrival at the way segment, a weighting factor of the way segment, a backup frequency known from the past and the up-to-dateness of already available data relating to said way segment.

26. The method according to claim 10, wherein transmitted data contain information concerning a signal type, a vehicle identification, the transmitting field strength used, a location of said vehicle, an unambiguous action code and a list of identifications of previously used transmitter vehicles in the form of a history list.

27. The method according to claim 10, wherein transmitted data contain information concerning at least one of way segment identifications, a moving direction, a proportion of a covered way segment, a mean velocity, a maximum velocity, the vehicle density, and an up-to-dateness/time marking of said information.

28. The method according to claim 26, wherein handing back a reply to an inquiry is carried out by using said history list.

29. The method according to claim 26, wherein handing back a reply to an inquiry by a relaying method is carried out in analogy with forwarding said inquiry.

30. The method according to claim 10, wherein said first vehicle creates and transmits a plurality of inquiries relating to single way segments, which are each at least one of individually answered and relayed as well as returned with a reply, or an inquiry relating to the entirety of way segments, wherein said inquiry relating to the entirety of way segments includes a plurality of partial inquiries relating to single way segments, which are successively answered or relayed by the vehicles of a chain of transmitter vehicles.

31. The method according to claim 10, wherein one or several groups of vehicles are formed which are each in possession of data of particular neighboring way segments, with group relevant data common to respective vehicles being available such that an inquiry concerning data of such groups may be answered by each vehicle of the group, or answering may be effected through few instances of relaying.

32. The method according to claim 31, wherein from said groups one or several superordinate groups are formed which are each in possession of data of particular neighboring way segments, wherein supergroup-relevant data common to the respective vehicles are available, such that an inquiry concerning data of such superordinate groups may be answered by each vehicle of the superordinate group, or answering may be effected through few instances of relaying.

33. The method according to claim 31, wherein vehicles of said group create and transmit data containing information relating to a position, extension and minimum lifetime of said group.

34. The method according to claim 33, wherein group data contain at least on of mean velocities, maximum velocities, vehicle density measures, up-to-datenesses/time markings and information relevance measures with respect to the entirety of the vehicles of said group.

35. The method according to claim 31, wherein group formation takes place in that group formation applications by one or several vehicles or subgroups are accumulated, and that the actual group formation is only determined when a threshold is exceeded.

36. The method according to claim 10, wherein to a vehicle or to a group of vehicles external data are supplied for directional or non-directional relaying, wherein a group formation may also be brought about through these external data.

37. The method according to claim 36, wherein said external data contain information relating to a back up prognosis.

38. The method according to claim 36, wherein information relating to a backup prognosis or other traffic-relevant quantities is extracted and stored externally, wherein it is also possible to cause a group formation from inside or from outside of said system in order to obtain the relevant quantities.

39. The method according to claim 36, wherein said external data contain information relating to connectivity with other traffic systems, such as at least one of railway, subway, urban railway, air and boat traffic.

40. The method according to claim 10, wherein information relating to a backup prognosis due to events detected in the past and occurring cyclically is generated from vehicle data signals and transmitted, wherein group formation may also be initiated for the purpose of cyclic backup prognosis.

41. The method according to claim 10, wherein information relating to a backup prognosis due to events detected in the recent past is generated from vehicle data signals through extrapolation of the traffic flows or simulation and transmitted, wherein group formation may also be initiated for the purpose of simulative backup prognosis.

42. The method according to claim 10, wherein the information relating to at least on of a backup prognosis and other traffic-relevant quantities is stored within a group of vehicles to be designated and continues to exist there.

43. The method according to claim 10, wherein data relating to a dangerous approach of said first vehicle to another vehicle pertaining to said traffic guidance system or to a group pertaining to said traffic guidance system is generated and transmitted.

44. The method according to claim 10, wherein harding back of inquiries that have not been answered takes place in the form of specially marked pseudo-replies.

45. The method according to claim 41, wherein the fact that a relayed inquiry has not been answered is detected in that when an inquiry is relayed by a particular vehicle, emission of a pseudo-reply is concurrently determined with a high delay time.

46. The method according to claim 45, wherein emission of said pseudo-reply from said particular vehicle is stopped in that another particular vehicle located within reach of said particular vehicle in its turn answers or relays said relayed inquiry, which fact may be recognized by said particular vehicle on account of an action code of said inquiry.

47. The method according to claim 1, wherein information is combined upon return of replies to inquiries or upon intermediate storage in transmitter vehicles, so that data from a greater distance may be compressed more strongly/resolved more roughly by an inquiring party.

48. The method according to claim 1, wherein emitted data signals are relayed, in analogy with processing inquiries, both along a one-dimensional channel up to a target location and also two-dimensionally into a more extended target area encoded into said data signal.

49. The method according to claim 1, wherein data signals contain information which, on account of a particular event, is created by a vehicle and transmitted directionally or non-directionally.

50. The method according to claim 1, wherein said vehicles are land vehicles for road or rail traffic, water vehicles, aircraft or other mobile, manned or unmanned units moving in a jointly utilized traffic space and capable of being equipped with limited range communication means.

51. The method according to claim 1, wherein vehicles may also be particular pseudo-vehicles having a special communicative purpose of sending data signals out of said traffic guidance system or into said traffic guidance system, feeding in third data, need not necessarily be mobile, but at least are equipped with compatible communication means.

52. The method according to claim 51, wherein via a pseudo-vehicle or a station a connection with another telecommunications network is established.

53. The method according to claim 51, wherein pseudo-vehicles or stations are created which are linked among each other by an external communication network and establish a more favorable mutual connection of said vehicles or between said vehicles and a transmitter/receiver located outside said traffic guidance system.

54. The method according to claim 51, wherein through at least one of said communication means and pseudo vehicles/stations a general telecommunications network is created.

55. A system for at least one of dynamically obtaining relevant traffic information and dynamic optimization of a route of a first vehicle pertaining to at least one of self-organizing traffic information system and a traffic guidance system to which further vehicles pertain, comprising in the first vehicle:

means for creating own data on the basis of at least one of on-board sensors and other information sources in said first vehicle;

means for emitting data that are relevant for said first vehicle or for other vehicles;

means for receiving data transmitted by other vehicles;

means for storing data obtained from at least one of received and own data;

means for relaying of received data by re-transmission of these data in a processed or unprocessed form; and means for creating and transmitting inquiries concerning data which may possibly be finished by other vehicles.

* * * * *

UNITED STATES PATENT AND TRADEMARK OFFICE
CERTIFICATE OF CORRECTION

PATENT NO. : 6,654,681 B1
DATED : November 25, 2003
INVENTOR(S) : Kiendl et al.

It is certified that error appears in the above-identified patent and that said Letters Patent is hereby corrected as shown below:

<u>Title page,</u>
Item [73], Assignee, please delete "Munich" and insert -- Munchen --.

<u>Column 19,</u>
Line 14, please delete "return ad" and insert -- returned --.

<u>Column 20,</u>
Line 13, please delete "If i" and insert -- if it --.

<u>Column 21,</u>
Line 59, please delete "harding" and insert -- handing --.
Line 62, please delete "claim 41" and insert -- claim 44 --.

Signed and Sealed this

Twenty-sixth Day of July, 2005

JON W. DUDAS
*Director of the United States Patent and Trademark Office*